United States Patent
Heung

[11] Patent Number: 6,015,041
[45] Date of Patent: Jan. 18, 2000

[54] APPARATUS AND METHODS FOR STORING AND RELEASING HYDROGEN

[75] Inventor: Leung K. Heung, Aiken, S.C.

[73] Assignee: Westinghouse Savannah River Company, Aiken, S.C.

[21] Appl. No.: 08/626,058

[22] Filed: Apr. 1, 1996

[51] Int. Cl.[7] .............................. C01B 3/04; F17C 11/00
[52] U.S. Cl. ........................................ 206/0.7; 423/658.2
[58] Field of Search ........................... 206/0.7; 423/658.2

[56] References Cited

U.S. PATENT DOCUMENTS

| | | | |
|---|---|---|---|
| 4,444,727 | 4/1984 | Yanagihara et al. | 423/658.2 |
| 4,505,120 | 3/1985 | Golben | 62/48 |
| 4,609,038 | 9/1986 | Ishikawa et al. | 165/104.12 |

FOREIGN PATENT DOCUMENTS

| | | |
|---|---|---|
| 31 50 133 A1 | 7/1983 | Germany . |
| 55-158101 | 12/1980 | Japan . |
| 56-114801A1 | 9/1981 | Japan . |
| 63-035401 | 2/1988 | Japan . |

OTHER PUBLICATIONS

English Translation of Japanese Patent Application No. 63–35401 (13 pages).

Groll, M., et al. "Investigation of Fast Reaction Beds for Metal Hydride Thermodynamic Engines," *Proceedings of the 5th World Hydrogen Energy Conference*, Toronto, Canada Jul. 15–20, 1984.

International Search Report for application No. PCT/US97/05178, dated Aug. 5, 1997.

*Primary Examiner*—Wayne Langel
*Attorney, Agent, or Firm*—Dean W. Russell, Esq.; Mitchell G. Stockwell, Esq.; Kilpatrick Stockton LLP

[57] ABSTRACT

A rechargeable device that stores and discharges hydrogen is described. The device stores hydrogen in a solid form and supplies hydrogen as a gas when needed. The solid storage medium may be metal hydride in a ground particle form that avoids the need for compaction or other treatment. Dividers partition a container into separate chambers, each provided with a matrix, formed from an appropriate material like a thermally-conductive aluminum foam, which forms a number of cells. For proper chamber size, the ratio of chamber length to container diameter should be between about 0.5 and 2. Metal hydride particles (or other hydrogen storage medium) may be placed within the cells, which help prevent excessive particle settling. The container is provided with a hydrogen transfer port through which hydrogen gas passes upon either discharging from or charging of the metal hydride particles. A filter may be placed within the port to allow hydrogen to flow but prevent particles from escaping. A heat transferring surface is formed by, for instance, a channel that is thermally coupled with the aluminum foam. Fluid flows through the channel to deliver or remove heat during the respective hydrogen discharging or charging processes.

8 Claims, 3 Drawing Sheets

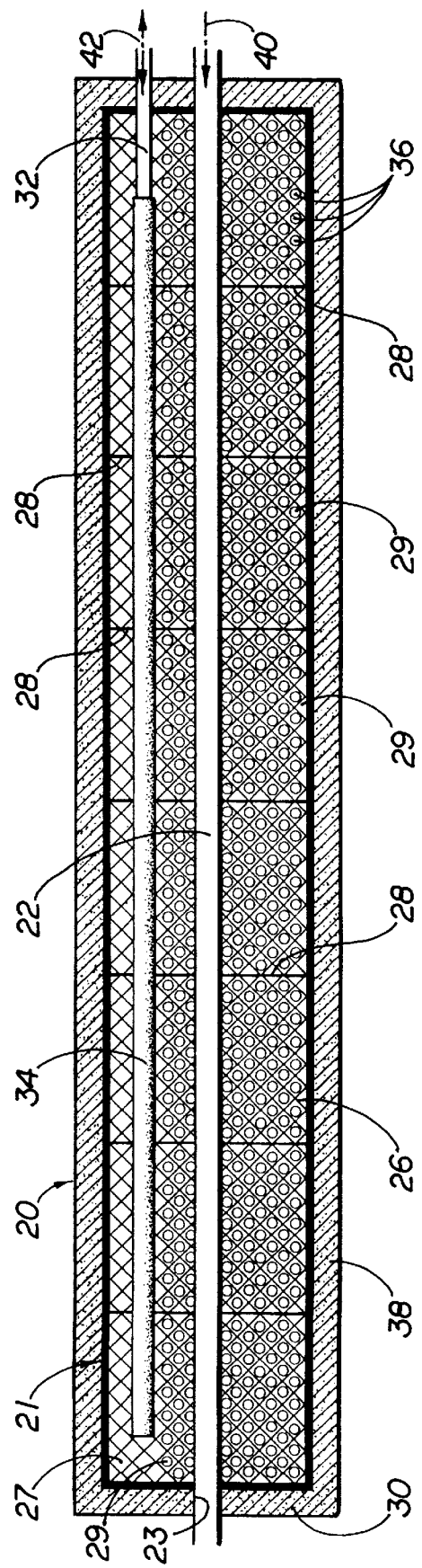
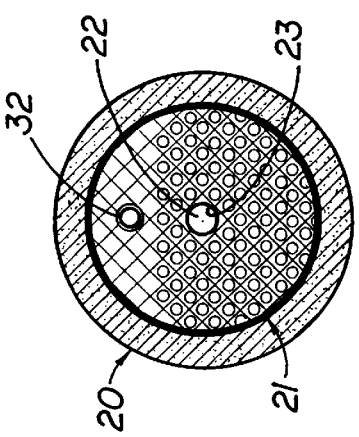
FIG 1A
FIG 1B

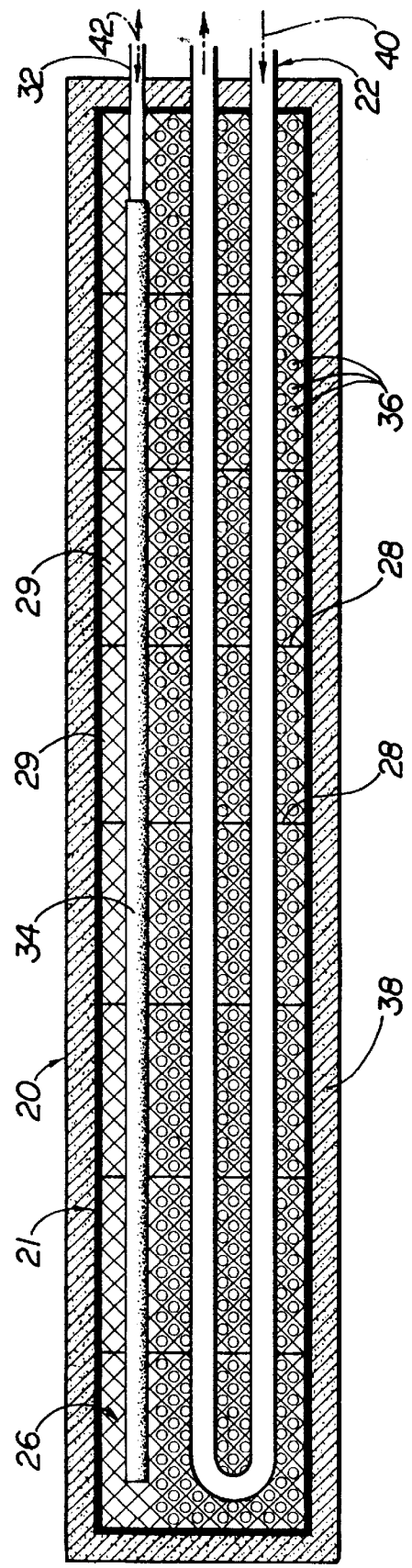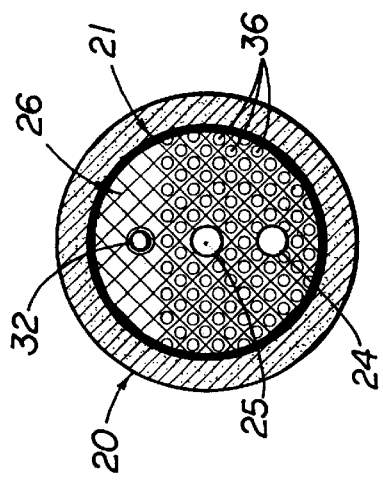
FIG 3A
FIG 3B

APPARATUS AND METHODS FOR STORING AND RELEASING HYDROGEN

The U.S. government has rights in this invention pursuant to contract no. DE-AC09-89-SR18035 between the U.S. Department of Energy and Westinghouse Savannah River Company.

FIELD OF THE INVENTION

This invention relates to a rechargeable device for storing and, when desired, releasing hydrogen. Among other applications, the device can be used in the energy generation or transportation industries.

BACKGROUND OF THE INVENTION

Hydrogen burns cleanly in air, producing water as a "waste" product. Powering vehicles, machinery or appliances with hydrogen powered engines or fuel cells eliminates the air pollution associated with fossil fuel powered engines.

But the heat value per volume of hydrogen is very low compared to fossil fuels like gasoline. The heat value per volume can be increased by placing the hydrogen under thousands of pounds per square inch of pressure, cooling it to a liquid, or absorbing it into a solid such as a metal hydride. Pressurizing or liquefying hydrogen requires bulky, expensive processing and storage equipment. It can also be dangerous. For instance, if liquid hydrogen is heated, it converts to a gas. This may significantly raise the pressure within its storage device, with possible drastic consequences.

Placing hydrogen in a solid form avoids these problems. Storing hydrogen as a solid has many advantages. For instance, volumetric hydrogen density in a solid such as a metal hydride is fairly high, about the same as liquid hydrogen, making metal hydride a compact storage medium. And binding the hydrogen as a solid means it will not desorb unless heat is applied, thereby improving safety.

Metal hydrides are heavy, however. The gravitational density of hydrogen is very low. This means the amount of energy per weight of metal hydride may be low compared to fossil fuels.

Metal hydride also creates several engineering problems. For instance, metal hydride tends to break down into fine particles that can plug a gas filter. The hydride particles expand and contract upon hydrogen absorption and desorption, respectively. This may cause densely packed metal hydride beds to form that when they expand may damage the container holding the metal hydride. Adding or removing heat is necessary to the hydrogen absorption and desorption processes; hydride powders transfer heat poorly, however.

Attempts to overcome these problems have been made. Some metal powders, like copper or aluminum powders, have been used as a binder to help hold pressed metal hydride powder in compacts. But the compacts expand and degrade over time. Sandwiching metal hydride particles between metal plates to keep the particles in place and improve heat transfer has also been tried. Yet the plates further increase the overall weight of the storage device. They also restrict the volume expansion of the particles. Operational problems eventually develop as the swelling and contraction of the particles begins to affect hydrogen fluid flow and heat transfer through the plates. Performance ultimately degrades.

SUMMARY OF THE INVENTION

The present invention overcomes these problems. It provides a rechargeable device to store and, when desired, release hydrogen. A solid storage medium, like metal hydride in a ground particle form, may be used to hold hydrogen. The storage medium is placed within a container. Dividers partition the container into chambers. A matrix, formed from a thermal foam or other appropriate materials and placed within the container, improves heat transfer and holds the solid hydrogen storage medium in separate cells. Although the storage medium may migrate somewhat among cells, the dividers prevent the storage medium from migrating into a different chamber. This helps evenly distribute the storage medium. When metal hydride particles are selected as the storage medium, the cell format avoids excessive particle settling but allows for particle expansion and contraction. The device also provide a modular design so that the total hydrogen capacity is flexible.

The matrix thermally couples to a heat transferring surface. For example, a channel or conduit can be provided for conveying a fluid by which heat is removed or added to the container to cause hydrogen absorption or desorption from the storage medium. Because the matrix is thermally conductive, it fully distributes heat throughout the container or transfers it to the heat transferring surface for removal by a coolant fluid. A heat transferring surface also could be formed by a heated, electrically or otherwise, platen placed in contact with the outer container walls, to the inside of which the matrix may be tightly fitted for good thermal conductivity. When heat removal is necessary, the platen could be cooled by surface radiation, assisted by a fan and/or thermal fins located on the platen side not coupled to the outer container walls.

A port located in the container allows hydrogen to enter in order to recharge the storage medium or exit when hydrogen desorption occurs. A porous filter, positioned within the port, keeps the storage medium in the container, while allowing hydrogen to pass. If the filter extends throughout most of the container it also helps hydrogen fluid circulate to and from the chambers.

In one embodiment, the hydrogen storage device comprises one or more modules. A module may be composed of multiple, interconnected containers, each formed from two roughly concentric pipes that lay horizontally. Attached or fitted tightly to the outside of the inner pipe is the matrix formed from a thermal foam, like an aluminum foam. It substantially fills the space between the two pipes. The thermal foam matrix forms a network of open cells. Metal hydride particles (or another hydrogen storing solid) occupy and migrate among these cells. But the particles cannot pass between dividers that partition the container into chambers providing even distribution while ensuring sufficient space for particle expansion following hydrogen absorption. This may be done by ensuring that the ratio of chamber length to container (inner) diameter ranges between about 0.5 and 2, and preferably is about 1. The space between the two pipes, roughly annular in shape, is sealed on both ends but for a single port through which hydrogen fluid may flow. A porous metal filter may be inserted in the port to prevent the escape of metal hydride particles but allow hydrogen fluid to flow. The filter can extend through substantially the length of the container to allow for better hydrogen fluid flow. Each module has several such containers, whose inner pipes and ports are interconnected.

When hydrogen release is desired, a hot fluid may be circulated through the inner pipes to release the hydrogen.

Thermal foam matrixes are tightly coupled to the outside of the inner pipes; each therefore distributes heat through its cells and ultimately to the storage medium. To recharge the storage medium, hydrogen is pumped into the interconnected ports, flows through the open cells and circulates about the storage medium. Hydrogen absorption results; it generates heat, which the thermal foam matrixes conduct to the inner pipes. A coolant fluid conveyed through the interconnected inner pipes removes the heat, thus increasing the efficiency of the charging process.

Storage containers can be formed in virtually any shape. For example, rectangular ducts partitioned into chambers having multiple cells could be used to hold the metal hydride particles. A channel for circulating coolant or hot fluids could surround the duct, pass through it or lie adjacent one or more of its walls to create a surface for adding or removing heat. A thermal foam matrix is thermally coupled to the surface for distributing the added heat throughout the container or delivering heat generated in the container to the surface, for removal.

Another embodiment uses a simple cylinder for the container. A generally "U-shaped" conduit inserts into the container for circulating heat transferring fluid that enters through one opening in the conduit and exits from another. The U-shaped conduit is particularly appropriate for a storage device whose length is more than about five times its (inner) diameter. For such storage devices a straight length of conduit or inner pipe may expand or contract with temperature changes; these movements may stress the container or the seals at the intersection of conduit and container. The U-shaped conduit, particularly if its base is separated a slight distance from the container end wall, allows for such expansion and contraction. Preferably, fluid enters the lower leg of the conduit that is positioned near the container bottom. This cools the lower part of the container first during hydrogen absorption. Thus, as the solid storage medium absorbs hydrogen, it will be able to push the top layers up as it expands. Failure to first cool the lower end may slow absorption and stress the container.

Multiple containers, in these or other configurations, can be interconnected into modules; multiple modules can be interconnected to even further increase the total hydrogen storage capacity of the device. For instance, two fluid-circulating conduits for different containers could be coupled so that the same coolant or hot fluid (e.g., water or air) circulates through both. Similarly, their ports can be manifolded together to allow for charging or discharging. Then, of course, several such modules could be interconnected to even further increase storage capacity or facilitate hydrogen release or charging of the selected solid hydrogen storage medium.

Ground metal hydride particles may be selected as the solid hydrogen storage medium. A reasonably priced metal hydride alloy can hold about 1.3% hydrogen by weight. But other materials could also be used. In fact, the percentage weight of hydrogen that can be stored in solid form is expected to increase as present materials are refined or new ones developed. Or the cost of better, presently available but expensive hydrogen storing solids may decline. Those new, better or cheaper storage mediums also can be used with the present invention.

Moreover, numerous material types could be selected in forming the container or its interior cell walls that hold the solid hydrogen storage medium. But material having high thermal conductivity is preferred. Also, surrounding modules or containers with insulation may provide greater control over the hydrogen absorption and release processes since the insulation minimizes the impact of the ambient environment on heat transfer to and from circulating fluids.

Multiple advantages flow from this hydrogen storage device. Some of those include:

A matrix formed from thermally conductive material like a thermal foam that improves heat transfer within the container;

Cells, formed by the matrix, which distribute heat to and from the solid hydrogen storage medium;

Dividers that separate the container into chambers that keep the storage medium evenly distributed among the chambers to avoid the particle expansion problem;

A modular design that permits simple adjustment of the total hydrogen capacity; and The use of a metal hydride in a ground particle form for the storage medium, which avoids the need for compaction or other treatment, thus lowering the cost.

This hydrogen storage device can be used in the energy and transportation industries. For instance, it can be used as a "hydrogen tank" for buses, cars, trucks, locomotives, boats or other vehicles presently using internal combustion engines or fuel cells. Additionally, such "hydrogen tanks" can be used for mobile power sources presently provided by gasoline or diesel fuel generators.

Accordingly, one object of the present invention is to provide a hydrogen storage device using a container partitioned into chambers.

It is another object of the present invention to provide a matrix formed from a thermally conductive material to improve heat transfer within the container. It is yet another object of the present invention to fill the chambers with the matrix to create multiple cells. It is also an object of the present invention to form the matrix from a thermal foam, like an aluminum foam, which will deliver heat to and conduct heat from the container.

It is the further object of the present invention to dispense within the cells a solid storage medium for holding hydrogen.

It is an additional object of the present invention to provide a heat transferring surface, like a channel or conduit for conveying fluid, which delivers heat to or removes heat from the solid storage medium.

It is yet an additional object of the present invention to provide a hydrogen transfer port through which hydrogen fluid may pass during discharging or charging of the hydrogen storage medium.

It is yet a further object of the present invention to provide a filter within the transfer port that passes hydrogen fluid but prevents escape of the storage medium from the container.

Other objects, features and advantages of the present invention will become apparent upon reviewing the remainder of this document, including the description, drawings and claims.

BRIEF DESCRIPTION OF THE DRAWINGS

FIG. 1A shows a side view of one embodiment of a hydrogen storage device according to the present invention.

FIG. 1B shows a cross-sectional view of the embodiment shown in FIG. 1A.

FIG. 3A shows a side view of yet another alternate embodiment of a hydrogen storage container.

FIG. 3B shows a cross-sectional view of the alternate embodiment shown in FIG. 3A.

DETAILED DESCRIPTION OF THE DRAWINGS

Figure 2A:
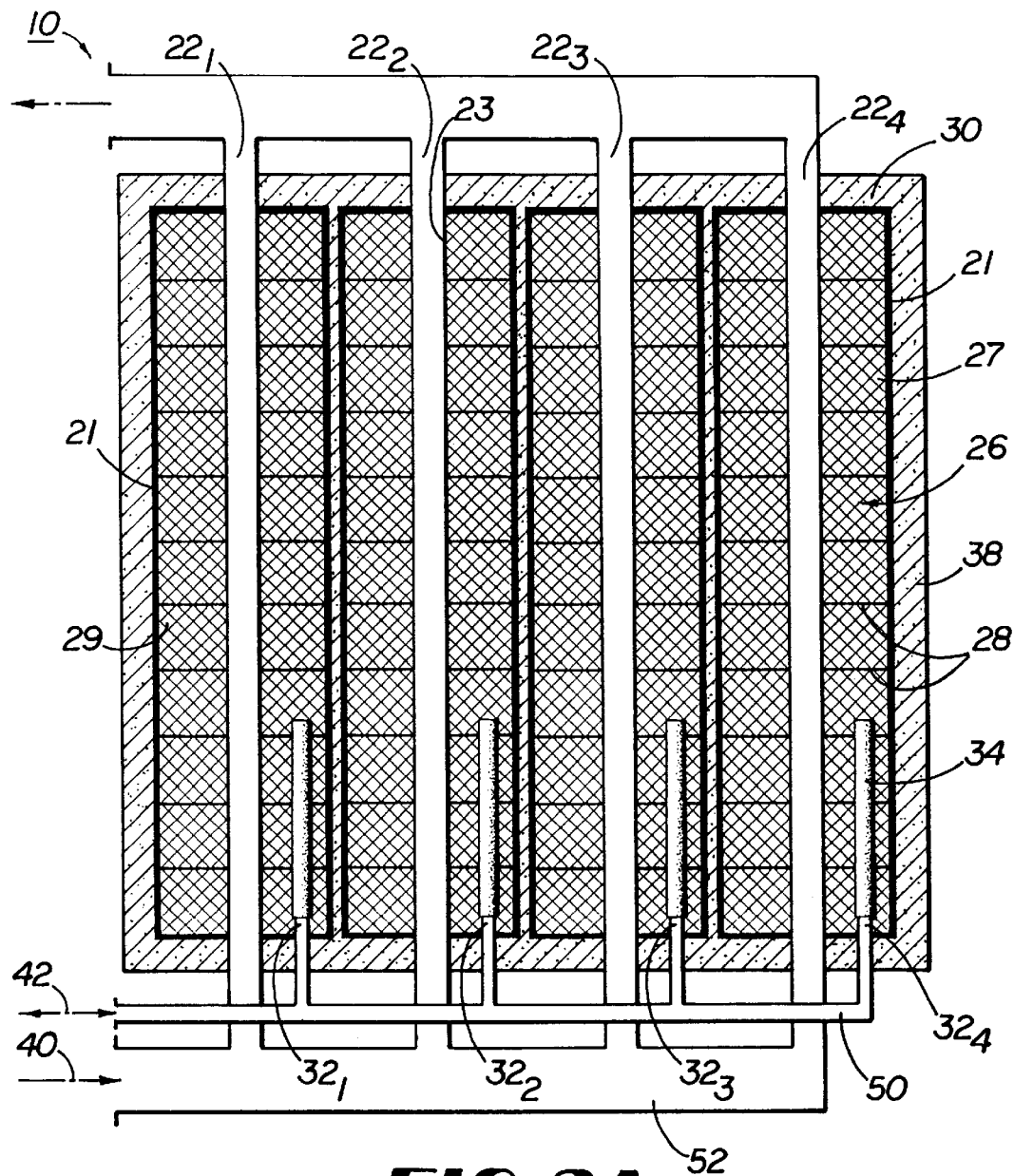
FIG. 2A shows a top view of an alternate embodiment of a hydrogen storage device comprising four interconnected containers.

FIG. 1 shows one embodiment of the invention that has a container 20. A conduit 22 passes through container 20. Dividers 28 partition container 20 into chambers 29. Between the conduit 22 and an outer container wall 21 lies a matrix 26 that forms numerous open cells 27. Insulation 38 may surround the container 20. Such insulation 38 helps prevent heat transfer from or to the ambient environment that may affect hydrogen absorption or desorption. A port 32 pierces both the insulation 38 and container wall 21 and allows a hydrogen fluid 42 to transfer to and from the container 20.

A fluid 40 may flow through the conduit 22. Fluid 40 may be heated water at, for instance, a temperature of 80° C. Fluid 40 could also be air or another liquid or gas suitable for transferring heat to and from the container 20. Heat carried by the fluid 40 is transferred through conduit walls 23 of the conduit 22. Conduit walls 23 thus both provide a surface through which heat is conveyed to and from the container 20 and also form interior walls for container 20. Matrix 26 preferably thermally couples (i.e., attaches snugly to the walls 23) to the conduit 22. Heat conducted through the conduit walls 23 may be distributed by the matrix 26 throughout the cells 27 to assist hydrogen desorption from a solid hydrogen storage medium held in the cells 27.

One solid storage medium may be a metal hydride, preferably in a particle form. One type of metal hydride that may be used is La—Ni—Al alloy with a composition: La:Ni:Al=1:4.9:0.1 in terms of atomic ratio. This composition has a hydrogen capacity of one hydrogen atom per metal atom (approximately 1.3% by weight). (This alloy actually does not need to use pure Lanthanum. Instead it may use a metal called "Lanthanum rich mischmetal" or "Lm," hereafter, which is produced by extracting more expensive rare earth elements like Cerium from mischmetal, leaving the resulting mixture rich in Lanthanum. Mischmetal is an alloy that consists of a crude mixture of Cerium, Lanthanum, Neodymnium and other rare-earth metals in the approximate ratio in which they naturally occur in the ore. Separating the Lanthanum entirely from the mixture is expensive, so the mixture itself is used to make the metal hydride alloy.) Although the Lm—Ni—Al alloy does not have the highest available percent weight concentration, it costs less than solids that could store more hydrogen by weight. If the percent by weight storage capacity of a particular solid storage medium is better (preferably 3% or more by weight), the same design could be used and the hydrogen storage capacity could be roughly tripled; or, the hydrogen storage capacity could be kept constant but the weight of the storage device could be decreased by a third or so. Thus, the present invention can be used with any solid storage medium. Indeed, it is anticipated that solids that can store more hydrogen by weight and still be reasonably priced will become available. This is important because as the weight of a fully charged hydrogen storage device decreases, the device becomes more feasible for commercial use in the transportation industry since the amount of energy delivered per unit of weight increases.

In any event, properly heated fluid 40 flowing through the conduit 22 causes or assists hydrogen desorption as heat transfers through the conduit walls 23, conducts through matrix 26 to various cells 27 and, ultimately, transfers to the solid storage medium, causing it to desorb hydrogen. Hydrogen gas flows through open cells 27 and ultimately from the container 20 via the port 32. Port 32 may be outfitted with a porous filter 34 that passes hydrogen fluid but prevents passage of metal hydride particles through the port 32. Filter 34 may be formed of metal or another appropriate material. Of course, port 32 can also accept incoming hydrogen that is reabsorbed by the solid storage medium. Circulating a coolant fluid 40 through conduit 22 will draw out the resulting generated heat, speeding and improving the hydrogen absorption process.

FIG. 1 also shows a cross-sectional view of the container 20, conduit 22, conduit walls 23 through which heat flows, outer container walls 21 and port 32. Matrix 26 fills the generally annular space separating the conduit 22 and outer walls 21 of the container 20 with multiple cells 27. An alternative embodiment could be formed by placing matrix 26 that forms the cells 27 within the conduit 22, sealing its ends but for the port 32, which would then be on conduit 22, and circulating heat transferring fluid through the annular space between conduit 22 and the outer container walls 21.

Figure 2B:
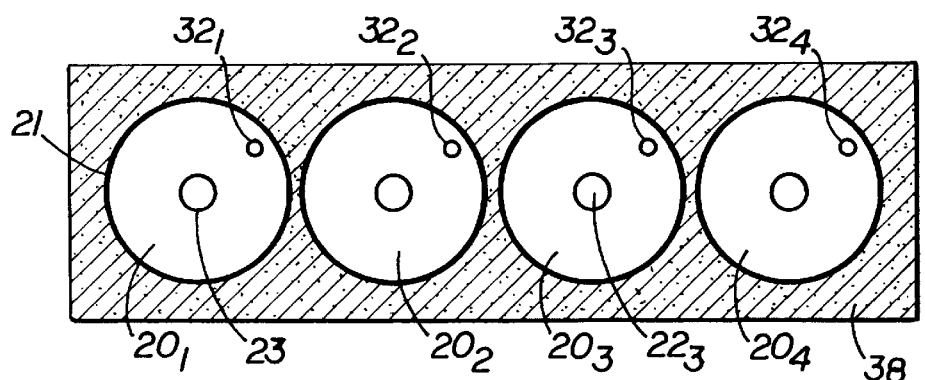
FIG. 2B shows a cross-sectional view of the alternate embodiment shown in FIG. 2A.

FIG. 2 shows four containers 20 interconnected to form a module 10 that is a larger capacity hydrogen storage device. The ports $32_{1,2,3,4}$ are connected by a hydrogen manifold 50. Likewise, a fluid manifold 52 connects the hollow cores $22_{1,2,3,4}$ through which fluid 40 flows. Other means, like tubing or pipes, could be used to couple the containers 20. Circulating a hot fluid 40 through the fluid manifold 52 transfers heat to each container 20, whose outer walls 21 can be thermally coupled for encouraging heat transfer among the containers 20. This causes hydrogen fluid 42 to discharge and flow out of ports $32_{1,23,4}$ and into the hydrogen manifold 50. Again, the process can be reversed for recharging the hydrogen solid storage medium held within the cells 27. During recharging, hydrogen fluid 42 is pumped through hydrogen manifold 50, flows through the ports $32_{1,2,3,4}$ into the containers 20, circulates among chambers 29 and is absorbed by the storage medium in the cells 27. The heat generated following absorption is conducted by matrix 26 to the conduit walls 23, which then transfer the heat to a coolant fluid 40 conveyed by the fluid manifold 52 into conduits 22.

Obviously, fewer or more than four containers 20 could be coupled together to form modules 10, or many multiple modules 10 could be interconnected in order to form a higher capacity hydrogen storage device. These interconnections could also be temporary. This would allow for more efficient charging as multiple containers 20 or modules 10 could be interconnected and charged together, then separated and dispersed back to various vehicles or power generation sites.

Increasing the storage capacity, with a better storage medium, a larger container 20 or providing a module 10, decreases the frequency of recharging the storage medium. The ability of the storage medium to be recharged degrades after multiple rechargings because impurities within the hydrogen gas used for recharging will impede the ability of the storage medium to store hydrogen. For example, if the recharging hydrogen fluid has oxygen impurities and the storage medium is a metal hydride, some metal hydride particles will oxidize. That oxidized material will not be able to reabsorb hydrogen; over time, the hydrogen storage capacity of the storage device gradually decreases. In order to minimize problems from storage medium degradation following multiple rechargings, the container 20 can be made recyclable. Means for refueling the container 20 may be provided. For instance, fueling ports can be located within each chamber 29. Periodically, fueling ports could be opened, old storage medium removed and new storage medium provided through the fueling ports. Removable plugs for the fueling ports maintain container 20 integrity. Fueling ports also can be used to charge the container 20 if it is first fabricated with everything but the hydrogen storage medium.

FIG. 3 shows an alternative embodiment of a hydrogen storage device container 20. Outer container wall 21 surrounds various sections of thermal foam matrix 26 separated by dividers 28. When placed in the container 20, matrix 26 forms the cells 27. Metal hydride particles 36 occupy most but not all of the cells 27 in the matrix 26. Insulation 38 surrounds the outer container wall 21 except for where a U-shaped conduit 22 and the hydrogen port 32 pierce the container wall 21.

U-shaped conduit 22 exposes more heat conducting surface area to the chambers 29 within the container 20 than does a straight conduit 22. This allows for better heat transfer from the fluid 40 flowing through the U-shaped conduit 22. Of course, fluid 40 can either be a coolant for removing heat from the container 20 during the charging process or fluid 40 can be heated in order to transfer heat to the container 20 and cause hydrogen desorption. Desorbed hydrogen flows through the porous filter 34 that extends substantially throughout the container 20. Extending the filter 34 through most of the container 20, or at least partially into each chamber 29, improves hydrogen fluid 42 flow within the container 20, allowing for better hydrogen desorption and absorption. But the filter 34 could be much shorter and dividers 28 could just be made permeable to hydrogen fluid 42 flow. Additionally making the dividers 28 non-permeable to metal hydride particles 36 prevents their migration among different chambers 29 within the container 20, thereby keeping an even distribution of the metal hydride particles 36 among the chambers in the container 20.

U-shaped conduit 22 is particularly useful for a container 20 whose ratio of container length to container diameter is greater than about five. For such longer containers, a straight conduit 22 will expand and contract in its center portion as temperature changes. This expansion and contraction stresses the seals about the ends 30 of the container 20 through which straight conduit 22 passes. Ultimately, the seals on the container 20 ends 30 may break, weaken or leak. U-shaped conduit 22 avoids this problem because its U-shaped end freely expands and contracts as it is positioned a slight distance away from the container end 30.

Also, as FIG. 3 shows, a lower leg 24 of the U-shaped conduit 22 is located close to the bottom of the container 20. Fluid flows into this lower leg 24 and out of the upper leg 25. When cooling the container 20 during hydrogen absorption, it is desirable to first cool the lower part of the container 20. This assures that the solid storage medium located in the bottom of the container 20 has room to expand. (If the top layer of the storage medium were cooled first, the top layer would expand and block the bottom layer from expanding upward. This could create stress on the container 20 and possibly slow hydrogen absorption). Moreover, by forcing hot fluid 40 first through the lower leg 24 of the U-shaped conduit 22 during hydrogen desorption, the heat will rise naturally through the container 20 and thereby be more evenly distributed.

One specific embodiment of the hydrogen storage device container 20 shown in FIG. 3 may be formed from a roughly five foot long stainless steel outer tube, with a three and one-half inch outer diameter and having sixty five mil (0.065 inch) thick walls, which when sealed at its open ends forms the container 20. A ¾ inch, schedule ten, stainless steel U-shaped conduit 22 may be provided for conveying fluid 40. Filter 34 inserted and sealed into the port 32 may be a sintered porous stainless steel tube about ½ inch in diameter, about four feet ten inches long and provided with multiple pores about ten microns ($\mu$m) in size.

Matrix 26 is attached snugly to the outer surface of the conduit 22 to ensure good contact between the matrix and the conduit 22, soldering or welding may be used. Matrix 26 can be formed in several segments or one lengthy segment; to fill one chamber 29 at a time. If matrix 26 is formed from an aluminum thermal foam material, cells 27 in the matrix 26 will be about 0.05 to 0.1 inches in diameter. Such aluminum thermal foam is commercially available from: Energy Research and Generation, Inc., with an office at 900 Stanford Avenue, Oakland, Calif., and which sells its aluminum foam product under the "DUOCELL™" name. Matrix 26 could also, however, be formed from other thermal foam or even more rigid materials, although preferably thermally conductive ones.

Cells 27 may be partially filled with metal hydride particles to an average density of about forty percent (40%) of the theoretical metal density of the metal hydride. Because the metal hydride is in particle form, its actual bulk takes up more volume than predicted by the theoretical metal density of the metal hydride. Moreover, when the metal hydride particles are saturated with hydrogen, they expand about twenty to thirty percent (20–30%). Accordingly, cells 27 should be filled with metal hydride particles 36 in an amount significantly less than their theoretical density and at least somewhat less than their bulk density. For this particular embodiment, the forty percent (40%) threshold was chosen based on working experience with metal hydride materials. Other materials that may have different expansion properties may result in a different filling percentage.

Assembly of this specific embodiment of the hydrogen storage device container 20 may be made by first placing the outer tube in a vertical position. U-shaped conduit 22 and the filter 34 are positioned over the outer tube. A first disc-shaped divider 28, formed from, e.g., aluminum and pierced by three holes (one for the filter 34, two for the legs 24, 25 of heat-transferring conduit 22), is slid down the conduit 22 until the disc outer periphery nests within the outer tube. Providing many such dividers 28 partitions the container 20 into chambers 29, which will be filled with sections of matrix 26. One section of matrix 26, which also has three holes, is then slid down the conduit 22. The circumference of the two holes fit the conduit 22 legs 24 and 25. The holes in the foam section may be slightly smaller than the outside diameter of the conduit; this ensures a tight fit and thermal coupling between foam section and the conduit 22. The foam section is slid down the conduit 22 until it nests against the first divider 28 (or the sealed end 30 of the container 20). Some space separates the end of the conduit 22 from the end 30 of the container 20. Metal hydride powder may then be placed within this first foam section. A second disc-shaped divider 28 is then slid down the conduit 22 until it nests against the first foam section.

The distance between the first and second dividers 28 should be such that the chamber length divided by the container diameter generates a ratio between about 0.5 to 2 and preferably 1. Chamber length is important because when particles expand during hydrogen absorption, they must expand up and out into the cells 27. But if dividers 28 make the chambers 29 too narrow, the solid storage medium expands only with difficulty. On the other hand, if chambers 29 are too long, and the container 20 shifts, solid storage medium can migrate within a chamber 29 to concentrate on one end. When the solid storage medium at that full end of the chamber 29 expands, it may form a tightly packed "cake" that places stress on the container 20. A one-to-one ratio between chamber 29 length and container 20 diameter is preferred as it helps prevent cake formation while also allowing for particle expansion.

In any event, a portion of the conduit 22, the first divider 28, the first foam section, and the second divider 28 are then slid into the outer tube. A second foam section is slid down the conduit 22 until it nests against the second divider 28. Metal hydride particles 36 are inserted, another divider 28 is placed over the second foam section and the process repeats until the container 20 is filled with dividers 28, foam matrix 26 sections and metal hydride particles 36. Removable or permanently sealed caps can be placed on the outer tube to seal the container 20, but for a hydrogen port 32 and the lower and upper legs 24, 25 of conduit 22.

Other fabrication methods could be used. For instance, matrix 26 could be preformed into sections, provided with a backing and attached or fitted to a shell that could then be attached to the conduit 22. Attachment could be interlocking tabs, by welding or soldering. Or, dividers 28 and foam matrix 26 sections could be separately soldered or welded to conduit 22.

Thus, the container 20 (which is five feet long and has a three and one-half inch outer diameter with a sixty-five mil thick wall) is filled with twenty-four kilograms of the Lm—Ni—Al alloy that has a hydrogen capacity of about 310 grams (3,500 standard liters). When fluid heated to about 80° C. flows through this embodiment, a hydrogen discharge pressure of about ten atmospheres is created.

Integrity of the container 20 is important, particularly for its outer shell. The container 20 must be formed of a material and design that will withstand whatever hydrogen discharge pressures are selected for a particular storage device. For example, a sixty-five mil stainless steel outer tube could be chosen to withstand a 500 psi discharge pressure. In designing the container 20 it is also important to match the desired pressure with the chosen material and thickness of the outer shell design so as to minimize the overall weight of the hydrogen storage device, particularly when it will be used in the transportation industry.

Another tradeoff to consider when designing the container 20 is the type of material. For instance, although stainless steel is a poor thermally conductive material, it is high in strength so that the overall weight of the hydrogen storage device is lowered. Aluminum is the next best choice when considering the thermal conductivity, strength and weight design factors. But aluminum welding is difficult, which increases fabrication costs. Also, the lower strength per volume of aluminum forces the use of a thicker shell. Nevertheless, stainless steel, aluminum, and fiberglass or high strength plastics could be used to form the container 20, in any desired shape.

The foregoing is provided for purposes of explaining and disclosing preferred embodiments of the present invention. Modifications and adaptations to the described embodiments, particularly including changes to the shape of the hydrogen storage device container, the network of cells contained within the container, and the shape or position of the fluid circulating channel, will be apparent to those skilled in the art. These changes and others may be made without departing from the scope or spirit of the invention in the following claims.

What is claimed is:

1. A device for storing and discharging hydrogen comprising:
   a. a container defining a longitudinal axis and comprising:
      i. a port for ingress and egress of the hydrogen;
      ii. an upper portion;
      iii. a lower portion; and
      iv. an exterior surface;
   b. hydrogen-storage media positioned within the container;
   c. at least one divider positioned within the container so as to divide it into a plurality of chambers, each chamber having hydrogen-storage media positioned therein;
   d. a conduit having an elongated section positioned in the lower portion of the container and generally parallel to its longitudinal axis, for conveying a fluid adapted to transfer heat to or draw heat from the hydrogen-storage media; and
   e. thermal insulation at least partially surrounding and contacting the exterior surface of the container.

2. A device according to claim 1 further comprising thermal foam positioned in at least one chamber.

3. A device according to claim 2 in which the thermal foam is cellular with interconnected open cells and the hydrogen-storage media comprises particles of at least one metal hydride.

4. A device for storing and discharging hydrogen comprising:
   a. a container comprising:
      i. a port for ingress and egress of the hydrogen;
      ii. an upper portion; and
      iii. a lower portion;
   b. hydrogen-storage media positioned within the container;
   c. at least one divider positioned within the container so as to divide it into a plurality of chambers, each chamber having hydrogen-storage media positioned therein; and
   d. a conduit having an elongated section positioned in the lower portion of the container, for conveying a fluid adapted to transfer heat to or draw heat from the hydrogen-storage media.

5. A device for storing and discharging hydrogen comprising:
   a. a container comprising:
      i. a port for ingress and egress of the hydrogen; and
      ii. an exterior surface;
   b. hydrogen-storage media positioned within the container;
   c. a conduit having a section positioned in the container for conveying a fluid adapted to transfer heat to or draw heat from the hydrogen-storage media; and
   d. thermal insulation at least partially surrounding and contacting the exterior surface of the container.

6. A device for storing and discharging hydrogen comprising:
   a. a container defining a longitudinal axis and comprising a port for ingress and egress of the hydrogen;
   b. hydrogen-storage media positioned within the container; and
   c. a conduit having a section positioned in the container generally parallel to its longitudinal axis, for conveying a fluid adapted to transfer heat to or draw heat from the hydrogen-storage media.

7. A device for storing and discharging hydrogen comprising:
   a. a container for holding hydrogen-storage particles, which container defines a longitudinal axis and a transverse axis;
   b. a foam matrix forming interconnected cells in which the hydrogen-storage particles reside;
   c. a plurality of dividers for (i) partitioning the container, along its longitudinal axis, into chambers, (ii) partitioning the foam matrix into sections, and (iii) limiting the hydrogen-storage particles from migrating along the longitudinal axis of the container, wherein each chamber contains at least one section of the foam matrix and provides an open area initially free of the hydrogen-storage particles and into which the hydrogen-storage particles expand along the transverse axis of the container following absorption of hydrogen; and
   d. a port to the container adapted to receive hydrogen into and discharge hydrogen from the container, the port comprising a filter passing through the open area in each chamber at least partially for preventing the hydrogen-storage particles from escaping the container through the port while allowing passage of hydrogen therethrough.

8. A device according to claim 7 further comprising a generally U-shaped conduit having an elongated section positioned in the container and generally parallel to its longitudinal axis, for conveying a fluid adapted to transfer heat to or draw heat from the hydrogen-storage particles.

* * * * *